(12) United States Patent
Shin et al.

(10) Patent No.: US 9,197,823 B2
(45) Date of Patent: Nov. 24, 2015

(54) X-RAY DETECTION DEVICE AND METHOD OF DRIVING AN X-RAY DETECTION PANEL

(71) Applicant: SAMSUNG DISPLAY CO., LTD., Yongin, Gyeonggi-Do (KR)

(72) Inventors: Chul-Woo Shin, Yongin (KR); Kyung-Hun Yoon, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 141 days.

(21) Appl. No.: 13/870,934

(22) Filed: Apr. 25, 2013

(65) Prior Publication Data

US 2014/0124675 A1 May 8, 2014

(30) Foreign Application Priority Data

Nov. 5, 2012 (KR) .................. 10-2012-0123950

(51) Int. Cl.
*G01T 1/20* (2006.01)
*H04N 5/32* (2006.01)

(52) U.S. Cl.
CPC .................................. *H04N 5/32* (2013.01)

(58) Field of Classification Search
CPC ........................................................ H04N 5/32
USPC ......................................................... 250/366
See application file for complete search history.

(56) References Cited

U.S. PATENT DOCUMENTS

| 2010/0001194 A1* | 1/2010 | Ishii et al. ............... 250/370.08 |
| 2010/0051819 A1 | 3/2010 | Jung et al. |
| 2011/0176038 A1* | 7/2011 | Kurokawa et al. ............ 348/294 |
| 2012/0061578 A1 | 3/2012 | Lim et al. |

FOREIGN PATENT DOCUMENTS

| KR | 10-2010-0026290 A | 3/2010 |
| KR | 10-2011-0122960 A | 11/2011 |
| KR | 10-2012-0027708 A | 3/2012 |

* cited by examiner

*Primary Examiner* — David Porta
*Assistant Examiner* — Edwin Gunberg
(74) *Attorney, Agent, or Firm* — Christie, Parker & Hale, LLP

(57) ABSTRACT

An X-ray detection device includes an X-ray detection panel having a plurality of gate-lines, a plurality of data-lines, a plurality of bias-lines, a plurality of pixel circuits, a gate driving circuit that sequentially provides a gate signal to the pixel circuits via the gate-lines when an X-ray detecting operation is performed, a readout integrated circuit that performs a readout operation of a detection signal that is output from the pixel circuits via the data-lines when the X-ray detecting operation is performed, a bias driving circuit that provides a forward-bias voltage or a reverse-bias voltage to the pixel circuits via the bias-lines, and an operation control circuit that controls a forward-biasing operation and an initializing operation to be simultaneously performed on the pixel circuits.

21 Claims, 9 Drawing Sheets

X-RAY DETECTION DEVICE AND METHOD OF DRIVING AN X-RAY DETECTION PANEL

CROSS-REFERENCE TO RELATED APPLICATION

This application claims priority to and the benefit of Korean Patent Applications No. 10-2012-0123950, filed on Nov. 5, 2012 in the Korean Intellectual Property Office (KIPO), the contents of which are incorporated herein in its entirety by reference.

BACKGROUND

1. Technical Field

Example embodiments relate generally to an X-ray detection technique. More particularly, embodiments of the inventive concept relate to an X-ray detection device and a method of driving an X-ray detection panel.

2. Description of the Related Art

Generally, conventional X-ray detection devices detect an X-ray using a chemical film. Thus, the conventional X-ray detection devices can be used only for an unmoving subject. In addition, the conventional X-ray detection devices may result in high costs because a new chemical film is required to detect the X-ray exposure. For this reason, a flat panel type X-ray detection device has been suggested. The flat panel type X-ray detection device implements a digital image based on a detection signal when a diode (e.g., PIN diode, etc) of each pixel circuit of the flat panel type X-ray detection device generates the detection signal (i.e., generates charges) corresponding to the X-ray.

The flat panel type X-ray detection device needs to eliminate the remaining charges in the diode of each pixel circuit prior to an X-ray detecting operation (another X-ray detecting operation) in order to reduce an image-lag. Hence, the diode of each pixel circuit is forward-biased prior to the X-ray detecting operation in the flat panel type X-ray detection device. For this operation, each pixel circuit includes additional transistors for forward-biasing the diode of each pixel circuit (i.e., in addition to a switching transistor), or each pixel circuit alternately performs the X-ray detecting operation and a forward-biasing operation for each gate-line.

However, compared to when each pixel circuit includes the switching transistor, a fill-factor may decrease, and a noise due to line capacitance increases may occur in the flat panel type X-ray detection device when each pixel circuit includes the switching transistor and the additional transistors. In addition, a frame-rate may necessarily decrease in the flat panel type X-ray detection device when each pixel circuit alternately performs the X-ray detecting operation and the forward-biasing operation for each gate-line. Therefore, these approaches may not be appropriate for manufacturing the flat panel type X-ray detection device in a big size.

SUMMARY

Aspects of some example embodiments are directed toward an X-ray detection device capable of simultaneously performing a forward-biasing operation on all pixel circuits included in an X-ray detection panel, and simultaneously performing an initializing operation on all pixel circuits included in the X-ray detection panel without fill-factor decreases and frame-rate decreases.

Aspects of some example embodiments are directed toward a method of driving an X-ray detection panel capable of simultaneously performing a forward-biasing operation on all pixel circuits included in the X-ray detection panel, and simultaneously performing an initializing operation on all pixel circuits included in the X-ray detection panel without fill-factor decreases and frame-rate decreases.

According to some example embodiments, an X-ray detection device may include an X-ray detection panel having a plurality of gate-lines, a plurality of data-lines, a plurality of bias-lines, and a plurality of pixel circuits, a gate driving circuit configured to sequentially provide a gate signal to the pixel circuits via the gate-lines when an X-ray detecting operation is performed, a readout integrated circuit configured to perform a readout operation of a detection signal that is output from the pixel circuits via the data-lines when the X-ray detecting operation is performed, a bias driving circuit configured to provide a forward-bias voltage or a reverse-bias voltage to the pixel circuits via the bias-lines, and an operation control circuit configured to control a forward-biasing operation and an initializing operation to be simultaneously performed on the pixel circuits.

In example embodiments, each of the pixel circuits may include a switching transistor having a gate terminal coupled to one of the gate-lines and a first terminal coupled to one of the data-lines, and a diode having a cathode coupled to a second terminal of the switching transistor and an anode coupled to one of the bias-lines.

In example embodiments, the diode may receive an X-ray to generate charges corresponding to the detection signal.

In example embodiments, the diode may receive a visible-ray to generate charges corresponding to the detection signal when an X-ray is converted to the visible-ray by a scintillator.

In example embodiments, the operation control circuit may include a first operation controller configured to connect the gate driving circuit to the X-ray detection panel when the X-ray detecting operation is performed, and to block the gate driving circuit from the X-ray detection panel when the forward-biasing operation and the initializing operation are performed, a second operation controller configured to be blocked from the X-ray detection panel when the X-ray detecting operation is performed, and to simultaneously provide a turn-on voltage corresponding to the gate signal to the pixel circuits via the gate-lines when the forward-biasing operation and the initializing operation are performed, and a third operation controller configured to be blocked from the X-ray detection panel when the X-ray detecting operation is performed, and to simultaneously provide a bias reference voltage to the pixel circuits via the data-lines when the forward-biasing operation is performed.

In example embodiments, the bias driving circuit may provide the reverse-bias voltage to the pixel circuits when the initializing operation and the X-ray detecting operation are performed, and the bias driving circuit may provide the forward-bias voltage to the pixel circuits when the forward-biasing operation is performed.

In example embodiments, the first operation controller may include a plurality of first transistors each having a first terminal coupled to one of the gate-lines and a second terminal coupled to the gate driving circuit, and a first control transistor having a first terminal coupled to the turn-on voltage, a second terminal coupled to respective gate terminals of the first transistors, and a gate terminal that receives a first control signal.

In example embodiments, the first control transistor may turn-on based on the first control signal, and the first transistors may simultaneously turn-on when the X-ray detecting operation is performed.

In example embodiments, the first control transistor may turn-off based on the first control signal, and the first transistors may simultaneously turn-off when the forward-biasing operation and the initializing operation are performed.

In example embodiments, the second operation controller may include a plurality of second transistors each having a first terminal coupled to one of the gate-lines and a second terminal coupled to a gate terminal of the second transistor, and a second control transistor having a first terminal coupled to the turn-on voltage, a second terminal coupled to respective gate terminals of the second transistors, and a gate terminal that receives a second control signal.

In example embodiments, the second control transistor may turn-off based on the second control signal, and the second transistors may simultaneously turn-off when the X-ray detecting operation is performed.

In example embodiments, the second control transistor may turn-on based on the second control signal, and the second transistors may simultaneously turn-on when the forward-biasing operation and the initializing operation are performed.

In example embodiments, the third operation controller may include a plurality of third transistors each having a first terminal coupled to one of the data-lines and a second terminal coupled to another of the data-lines, a third sub-transistor having a first terminal coupled to the bias reference voltage and a second terminal coupled to one of the third transistors, and a third control transistor having a first terminal coupled to the turn-on voltage, a second terminal coupled to respective gate terminals of the third transistors and a gate terminal of the third sub-transistor, and a gate terminal that receives a third control signal.

In example embodiments, the third control transistor may turn-off based on the third control signal, and the third sub-transistor and the third transistors may simultaneously turn-off when the initializing operation and the X-ray detecting operation are performed.

In example embodiments, the third control transistor may turn-on based on the third control signal, and the third sub-transistor and the third transistors may simultaneously turn-on when the forward-biasing operation is performed.

In example embodiments, an initialization reference voltage may be provided to the data-lines by the readout integrated circuit when the initializing operation is performed.

In example embodiments, the third operation controller may include a plurality of third transistors each having a first terminal coupled to one of the data-lines and a second terminal coupled to another of the data-lines, a reference voltage selection circuit configured to output the bias reference voltage when the forward-biasing operation is performed, and to output an initialization reference voltage when the initializing operation is performed, a third sub-transistor having a first terminal coupled to the reference voltage selection circuit and a second terminal coupled to one of the third transistors, and a third control transistor having a first terminal coupled to the turn-on voltage, a second terminal coupled to respective gate terminals of the third transistors and a gate terminal of the third sub-transistor, and a gate terminal that receives a third control signal.

In example embodiments, the third control transistor may turn-off based on the third control signal, and the third sub-transistor and the third transistors may simultaneously turn-off when the X-ray detecting operation is performed.

In example embodiments, the third control transistor may turn-on based on the third control signal, and the third sub-transistor and the third transistors may simultaneously turn-on when the forward-biasing operation and the initializing operation are performed.

In example embodiments, the initialization reference voltage may be provided to the data-lines by the third operation controller when the initializing operation is performed.

According to some example embodiments, a method of driving an X-ray detection panel having a plurality of gate-lines, a plurality of data-lines, a plurality of bias-lines, and a plurality of pixel circuits may include a step of simultaneously performing a forward-biasing operation on the pixel circuits, a step of simultaneously performing an initializing operation on the pixel circuits, and a step of sequentially performing an X-ray detecting operation on the pixel circuits for each gate-line.

In example embodiments, the step of simultaneously performing the forward-biasing operation may include a step of simultaneously providing a turn-on voltage to the gate-lines, a step of simultaneously providing a bias reference voltage to the data-lines, and a step of simultaneously providing a forward-bias voltage to the bias-lines.

In example embodiments, the step of simultaneously performing the initializing operation may include a step of simultaneously providing a turn-on voltage to the gate-lines, a step of simultaneously providing an initialization reference voltage to the data-lines, and a step of simultaneously providing a reverse-bias voltage to the bias-lines.

In example embodiments, the step of sequentially performing the X-ray detecting operation may include a step of sequentially providing a gate signal to the gate-lines, a step of simultaneously providing a reverse-bias voltage to the bias-lines, and a step of sequentially performing a readout operation of a detection signal that is output from the data-lines.

Therefore, an X-ray detection device according to example embodiments efficiently reduces an image-lag without fill-factor decreases and frame-rate decreases by simultaneously performing a forward-biasing operation on all pixel circuits included in an X-ray detection panel, and by simultaneously performing an initializing operation on all pixel circuits included in the X-ray detection panel.

In addition, a method of driving an X-ray detection panel according to example embodiments efficiently reduces an image-lag without fill-factor decreases and frame-rate decreases by simultaneously performing a forward-biasing operation on all pixel circuits included in the X-ray detection panel, and by simultaneously performing an initializing operation on all pixel circuits included in the X-ray detection panel.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
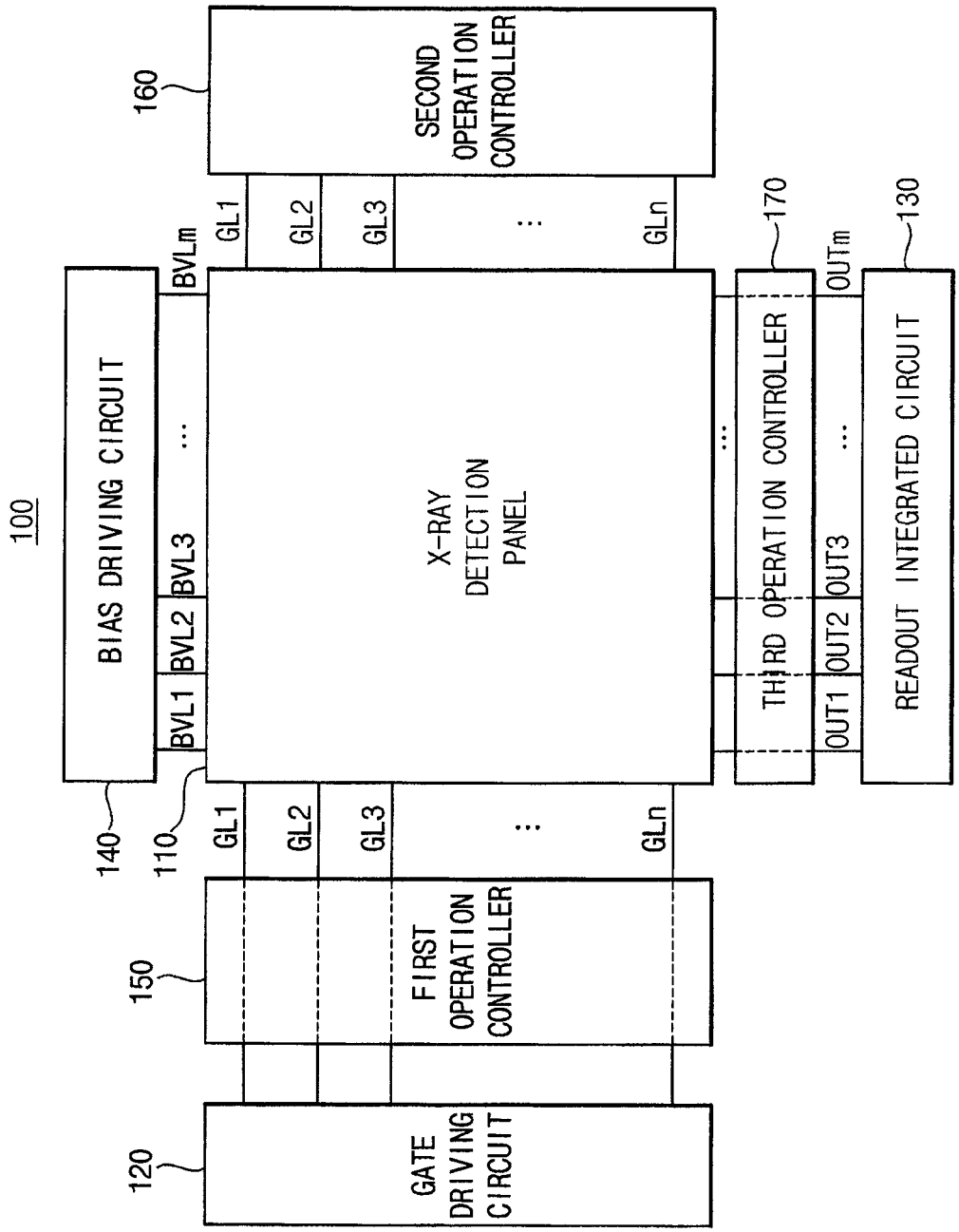
FIG. 1 is a block diagram illustrating an X-ray detection device according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening element(s) may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an X-ray detection device according to example embodiments.

Referring to FIG. 1, the X-ray detection device 100 may include an X-ray detection panel 110, a gate driving circuit 120, a readout integrated circuit 130, a bias driving circuit 140, and an operation control circuit (i.e., a first operation controller 150, a second operation controller 160, and a third operation controller 170).

When an X-ray generation device illuminates an X-ray to penetrate a subject, the X-ray detection device 100 may detect the X-ray. For this operation, the X-ray detection panel 110 may include a plurality of gate-lines GL1 through GLn, a plurality of data-lines OUT1 through OUTm, a plurality of bias-lines BVL1 through BVLm, and a plurality of pixel circuits. In one example embodiment, the gate-lines GL1 through GLn may be arranged in a first direction, and the data-lines OUT1 through OUTm and the bias-lines BVL1 through BVLm may be arranged in a second direction. For example, the first direction may cross (or be perpendicular to) the second direction. The pixel circuits may be arranged at locations corresponding to crossing points of the gate-lines GL1 through GLn and the data-lines OUT1 through OUTm. Thus, the pixel circuits may be arranged in a matrix form in the X-ray detection panel 110. Each pixel circuit may include a switching transistor and a diode (e.g., PIN diode, etc). Specifically, a gate terminal of the switching transistor may be coupled to one of the gate-lines GL1 through GLn, a first terminal of the switching transistor may be coupled to one of the data-lines OUT1 through OUTm, and a second terminal of the switching transistor may be coupled to a cathode of the diode. In addition, the cathode of the diode may be coupled to the second terminal of the switching transistor, and an anode of the diode may be coupled to one of the bias-lines BVL1 through BVLm. The diode may operate as an optical sensor. In one example embodiment, the diode may receive the X-ray to generate charges corresponding to a detection signal. In another example embodiment, the diode may receive a visible-ray to generate the charges corresponding to the detection signal when the X-ray is converted to the visible-ray by a scintillator. The scintillator may convert the X-ray to the visible-ray because the scintillator has a material that emits light (i.e., the visible-ray) based on a collision with the X-ray.

The gate driving circuit 120 may be connected to the X-ray detection panel 110 when the X-ray detecting operation is performed. Then, the gate driving circuit 120 may sequentially provide a gate signal (or, a scan signal) to the pixel circuits via the gate-lines GL1 through GLn. On the other hand, the gate driving circuit 120 may be blocked from the X-ray detection panel 110 when the forward-biasing operation and the initializing operation are performed. Here, a connection between the X-ray detection panel 110 and the gate driving circuit 120 may be controlled by the first operation controller 150. The readout integrated circuit 130 may perform a readout operation of a detection signal, where the detection signal is input from the pixel circuits via the data-lines OUT1 through OUTm, when the X-ray detecting operation is performed. That is, the readout integrated circuit 130 may be coupled to the pixel circuits via the data-lines OUT1 through OUTm of the X-ray detection panel 110. In addition, the readout integrated circuit 130 may receive the charges (i.e., the detection signal) generated by the diode of each pixel circuit. In some example embodiments, the readout integrated circuit 130 may convert the detection signal to a digital signal using an analog-to-digital converting (ADC) circuit, etc. Thus, the X-ray detection device 100 may implement a digital image by performing the readout operation of the detection signal when the detection signal is output from the pixel circuits. The bias driving circuit 140 may provide a forward-bias voltage and a reverse-bias voltage to the pixel circuits via the bias-lines BVL1 through BVLm. Here, a voltage level of the forward-bias voltage is higher than a voltage level of the reverse-bias voltage. Specifically, the bias driving circuit 140 may provide the reverse-bias voltage to the pixel circuits when the initializing operation and the X-ray detecting operation are performed, and may provide the forward-bias voltage to the pixel circuits when the forward-biasing operation is performed.

The operation control circuit 150, 160, and 170 may control the forward-biasing operation to be simultaneously performed on all pixel circuits, and may control the initializing operation to be simultaneously performed on all pixel circuits. As described above, the operation control circuit 150, 160, and 170 may include the first operation controller 150, the second operation controller 160, and the third operation controller 170. The first operation controller 150 may connect the gate driving circuit 120 to the X-ray detection panel 110 when the X-ray detecting operation is performed, and may block the gate driving circuit 120 from the X-ray detection panel 110 when the forward-biasing operation and the initializing operation are performed. The second operation controller 160 may be blocked from the X-ray detection panel 110 when the X-ray detecting operation is performed, and may simultaneously provide a turn-on voltage corresponding to the gate signal to the pixel circuits via the gate-lines GL1 through GLn when the forward-biasing operation and the initializing operation are performed. Here, the turn-on voltage may be determined as a voltage that is capable of turning-on the switching transistor of each pixel circuit. For example, the turn-on voltage may have the same voltage level as the gate signal, or may have a different voltage level from the gate signal. The third operation controller 170 may be blocked from the X-ray detection panel 110 when the X-ray detecting operation is performed, and may simultaneously provide a bias reference voltage to the pixel circuits via the data-lines OUT1 through OUTm when the forward-biasing operation is performed. In one example embodiment, the third operation controller 170 may simultaneously provide an initialization reference voltage to the pixel circuits via the data-lines OUT1 through OUTm when the initializing operation is performed. In another example embodiment, the third operation controller 170 may be blocked from the X-ray detection panel 110 when the initializing operation is performed. In this case, the readout integrated circuit 130 may simultaneously provide the initialization reference voltage to the pixel circuits via the data-lines OUT1 through OUTm when the initializing operation is performed.

As such, because of the operation control circuit 150, 160, and 170, the X-ray detection device 100 may simultaneously perform the forward-biasing operation on all pixel circuits of the X-ray detection panel 110, and may simultaneously perform the initializing operation on all pixel circuits of the X-ray detection panel 110. As a result, the X-ray detection device 100 may efficiently reduce an image-lag without fill-factor decreases and frame-rate decreases. In some example embodiments, the gate-lines GL1 through GLn, the data-lines OUT1 through OUTm, the bias-lines BVL1 through BVLm, and the pixel circuits (i.e., the switching transistors and the diodes) may be integrated on the X-ray detection panel 110. In addition, the gate driving circuit 120, the readout integrated circuit 130, the bias driving circuit 140 and/or the operation control circuit 150, 160, and 170 may be implemented by one chip. In this case, the chip may be directly attached to the X-ray detection panel 110, or may be attached to the X-ray detection panel 110 in a tape carrier package (TCP) using a flexible printed circuit (FPC) film. However, a manufacturing method of the X-ray detection device 100 is not limited thereto.

Figure 2:
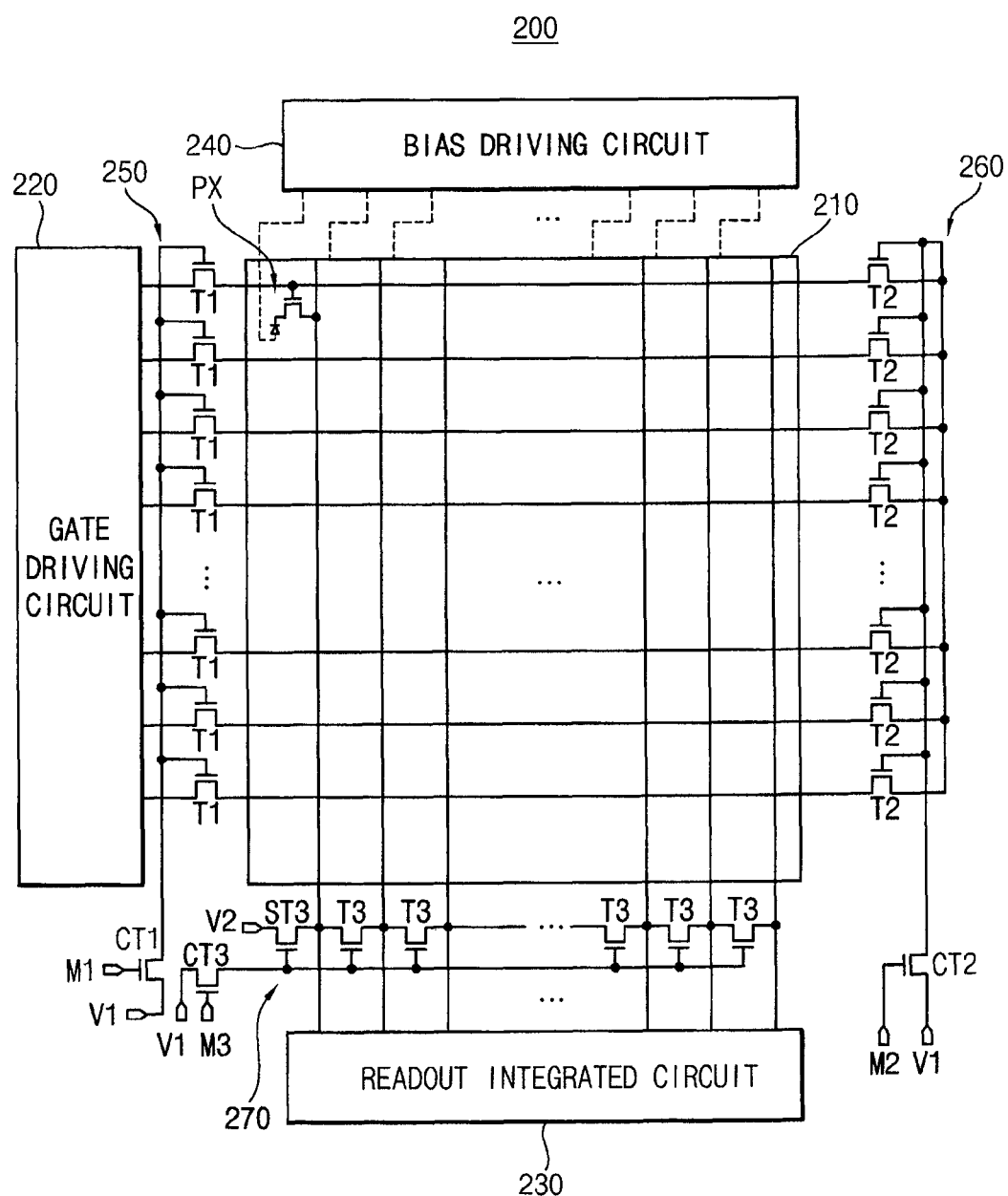
FIG. 2 is a block diagram illustrating an example embodiment of an X-ray detection device of FIG. 1.
Figure 3:
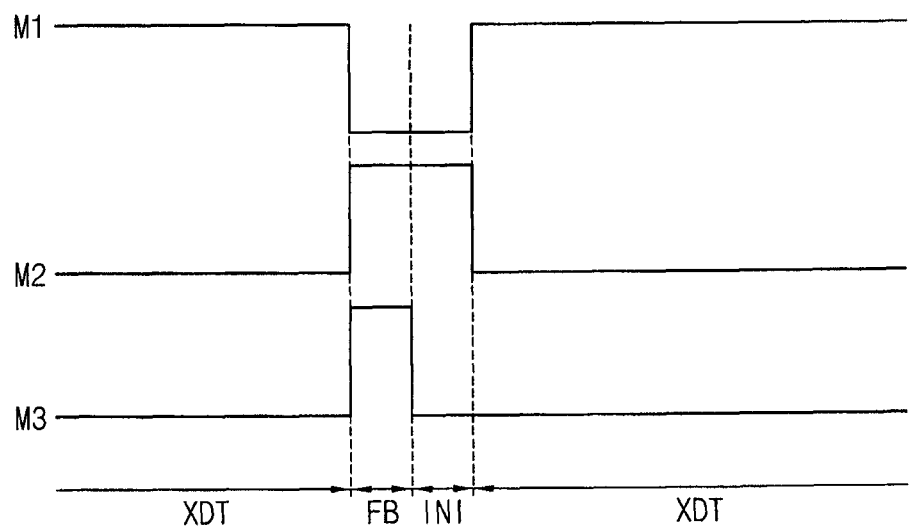
FIG. 3 is a timing diagram illustrating an example in which an X-ray detection device of FIG. 2 operates.

FIG. 2 is a block diagram illustrating an example embodiment of an X-ray detection device of FIG. 1. FIG. 3 is a timing diagram illustrating an example in which an X-ray detection device of FIG. 2 operates.

Referring to FIGS. 2 and 3, an example embodiment of the X-ray detection device 100 of FIG. 1 is illustrated in FIG. 2. In more detail, the X-ray detection device 200 may include an X-ray detection panel 210, a gate driving circuit 220, a readout integrated circuit 230, a bias driving circuit 240, and an operation control circuit 250, 260, and 270. Since the X-ray detection panel 210, the gate driving circuit 220, the readout integrated circuit 230, and the bias driving circuit 240 are described above, the X-ray detection device 200 will be described focused on the operation control circuit 250, 260, and 270. As described above, the operation control circuit 250, 260, and 270 may include a first operation controller 250, a second operation controller 260, and a third operation controller 270 to simultaneously perform a forward-biasing operation on all pixel circuits PX, and to simultaneously perform an initializing operation on all pixel circuits PX. As illustrated in FIG. 2, each pixel circuit PX may include a switching transistor and a diode. Specifically, a gate terminal of the switching transistor may be coupled to one of the gate-lines GL1 through GLn, a first terminal of the switching transistor may be coupled to one of the data-lines OUT1 through OUTm, and a second terminal of the switching transistor may be coupled to a cathode of the diode. In addition, an anode of the diode may be coupled to one of the bias-lines BVL1 through BVLm.

The first operation controller 250 may connect the gate driving circuit 220 to the X-ray detection panel 210 when an X-ray detecting operation XDT is performed, and may block the gate driving circuit 220 from the X-ray detection panel 210 when a forward-biasing operation FB and an initializing operation INI are performed. For this operation, the first operation controller 250 may include a plurality of first transistors T1 and a first control transistor CT1. Specifically, a first terminal of the first transistor T1 may be coupled to one of the gate-lines GL1 through GLn, a second terminal of the first transistor T1 may be coupled to the gate driving circuit 220, and a gate terminal of the first transistor T1 may be coupled to a second terminal of the first control transistor CT1. As illustrated in FIG. 2, the first transistors T1 may be coupled in parallel. In addition, a first terminal of the first control transistor CT1 may be coupled to a turn-on voltage V1, the second terminal of the first control transistor CT1 may be coupled to respective gate terminals of the first transistors T1, and a gate terminal of the first control transistor CT1 may receive a first control signal M1. As a result, the first transistors T1 may simultaneously turn-on when the X-ray detecting operation XDT is performed because the turn-on voltage V1 is simultaneously provided to respective gate terminals of the first transistors T1 as the first control transistor CT1 turns-on based on the first control signal M1 (e.g., a high voltage level in FIG. 3). On the other hand, the first transistors T1 may simultaneously turn-off when the forward-biasing operation FB and the initializing operation INI are performed because the first control transistor CT1 turns-off based on the first control signal M1 (e.g., a low voltage level in FIG. 3). Thus, the gate driving circuit 220 may be connected to the X-ray detection panel 210 when the X-ray detecting operation XDT is performed in the X-ray detection device 200, and the gate driving circuit 220 may be blocked from the X-ray detection panel 210 when the forward-biasing operation FB and the initializing operation INI are performed in the X-ray detection device 200. Since a structure of the first operation controller 250 illustrated in FIG. 2 is an example, the structure of the first operation controller 250 may be variously designed as long as the first operation controller 250 performs the same function as described above.

The second operation controller 260 may be blocked from the X-ray detection panel 210 when the X-ray detecting operation XDT is performed, and may simultaneously provide the turn-on voltage V1 corresponding to the gate signal to the pixel circuits PX via the gate-lines GL1 through GLn when the forward-biasing operation FB and the initializing operation INI are performed. For this operation, the second operation controller 260 may include a plurality of second transistors T2 and a second control transistor CT2. Specifically, a first terminal of the second transistor T2 may be coupled to one of the gate-lines GL1 through GLn, and a second terminal of the second transistor T2 may be coupled to a gate terminal of the second transistor T2. As illustrated in FIG. 2, the second transistors T2 may also be coupled in parallel. In addition, a first terminal of the second control transistor CT2 may be coupled to the turn-on voltage V1, a second terminal of the second control transistor CT2 may be coupled to respective gate terminals of the second transistors T2, and a gate terminal of the second control transistor CT2 may receive a second control signal M2. As a result, the second transistors T2 may simultaneously turn-off when the X-ray detecting operation XDT is performed because the second control transistor CT2 turns-off based on the second control signal M2 (e.g., a low voltage level in FIG. 3). On the other hand, the second transistors T2 may simultaneously turn-on when the forward-biasing operation FB and the initializing operation INI are performed because the turn-on voltage V1 is simultaneously provided to respective gate terminals of the second transistors T2 as the second control transistor CT2 turns-on based on the second control signal M2 (e.g., a high voltage level in FIG. 3). That is, the turn-on voltage V1 may be simultaneously provided to the pixel circuits PX via the gate-lines GL1 through GLn. Thus, the second operation controller 260 may be blocked from the X-ray detection panel 210 when the X-ray detecting operation XDT is performed in the X-ray detection device 200, and the second operation controller 260 may be connected to the X-ray detection panel 210 when the forward-biasing operation FB and the initializing operation INI are performed in the X-ray detection device 200. Since a structure of the second operation controller 260 illustrated in FIG. 2 is an example, the structure of the second operation controller 260 may be variously designed as long as the second operation controller 260 performs the same function as described above.

The third operation controller 270 may be blocked from the X-ray detection panel 210 when the X-ray detecting operation XDT is performed, may simultaneously provide the bias reference voltage V2 to the pixel circuits PX via the data-lines OUT1 through OUTm when the forward-biasing operation FB is performed, and may be blocked from the X-ray detection panel 210 when the initializing operation INI is performed. For this operation, the third operation controller 270 may include a plurality of third transistors T3, a third sub-transistor ST3, and a third control transistor CT3. Specifically, a first terminal of the third transistor T3 may be coupled to one of the data-lines OUT1 through OUTm, a second terminal of the third transistor T3 may be coupled to another of the data-lines OUT1 through OUTm, and a gate terminal of the third transistor T3 may be coupled to a second terminal of the third control transistor CT3. In addition, a first terminal of the third sub-transistor ST3 may be coupled to the bias reference voltage V2, a second terminal of the third sub-transistor ST3 may be coupled to one of the third transistors T3, and a gate terminal of the third sub-transistor ST3 may be coupled to the second terminal of the third control transistor CT3. As illustrated in FIG. 2, the third transistors T3 and the third sub-transistor ST3 may be coupled in series. Here, a first terminal of the third control transistor CT3 may be coupled to the turn-on voltage V1, a second terminal of the third control transistor CT3 may be coupled to respective gate terminals of the third transistors T3, and a gate terminal of the third control transistor CT3 may receive a third control signal M3. As a result, the third transistors T3 and the third sub-transistor ST3 may simultaneously turn-off when the initializing operation INI and the X-ray detecting operation XDT are performed because the third control transistor CT3 turns-off based on the third control signal M3 (e.g., a low voltage level in FIG. 3). On the other hand, the third transistors T3 and the third sub-transistor ST3 may simultaneously turn-on when the forward-biasing operation FB is performed because the turn-on voltage V1 is simultaneously provided to respective gate terminals of the third transistors T3 and the gate terminal of the third sub-transistor ST3 as the third control transistor CT3 turns-on based on the third control signal M3 (e.g., a high voltage level in FIG. 3). That is, the bias reference voltage V2 may be simultaneously provided to the pixel circuits PX via the data-lines OUT1 through OUTn. Thus, the third operation controller 270 may be blocked from the X-ray detection panel 210 when the initializing operation INI and the X-ray detecting operation XDT are performed in the X-ray detection device 200, and the third operation controller 270 may be connected to the X-ray detection panel 210 when the forward-biasing operation FB is performed in the X-ray detection device 200. Here, when the forward-biasing operation FB is performed, a voltage level of the bias reference voltage V2 that is provided via the data-lines OUT1 through OUTm may be lower than a voltage level of the forward-bias voltage that is provided via the bias-lines BVL1 through BVLm. Accordingly, when the forward-biasing operation FB is performed, a diode of each pixel circuit PX may be forward-biased. Since a structure of the third operation controller 270 illustrated in FIG. 2 is an example, the structure of the third operation controller 270 may be variously designed as long as the third operation controller 270 performs the same function as described above.

As such, because of the first through third operation controllers 250, 260, and 270, the X-ray detection device 200 may simultaneously perform the forward-biasing operation FB on the pixel circuits PX by simultaneously providing the turn-on voltage V1 to the pixel circuits PX via the gate-lines GL1 through GLn, by simultaneously providing the bias reference voltage V2 to the pixel circuits PX via the data-lines OUT1 through OUTm, and by simultaneously providing the forward-bias voltage to the pixel circuits PX via the bias-lines BVL1 through BVLm when the forward-biasing operation FB is performed. In addition, because of the first through third operation controllers 250, 260, and 270, the X-ray detection device 200 may simultaneously perform the initializing operation INI on the pixel circuits PX by simultaneously providing the turn-on voltage V1 to the pixel circuits PX via the gate-lines GL1 through GLn, by simultaneously providing the initialization reference voltage to the pixel circuits PX via the data-lines OUT1 through OUTm, and by simultaneously providing the reverse-bias voltage to the pixel circuits PX via the bias-lines BVL1 through BVLm when the initializing operation INI is performed. Here, the initialization reference voltage may be provided by the readout integrated circuit 230 because the third operation controller 270 is blocked from the X-ray detection panel 210 when the initializing operation INI is performed. Further, because of the first through third operation controllers 250, 260, and 270, the X-ray detection device 200 may sequentially perform the X-ray detecting operation XDT on the pixel circuits PX for each gate-line by sequentially providing the gate signal to the pixel circuits PX via the gate-lines GL1 through GLn, by simultaneously providing the reverse-bias voltage to the pixel circuits PX via the bias-lines BVL1 through BVLm, and by sequentially performing the readout operation of the detection signal output from the data-lines OUT1 through OUTm when the X-ray detecting operation XDT is performed. Therefore, the X-ray detection device 200 may efficiently reduce an image-lag without fill-factor decreases and frame-rate decreases by simultaneously performing the forward-biasing operation FB on all pixel circuits PX included in the X-ray detection panel 210, and by simultaneously performing the initializing operation INI on all pixel circuits PX included in the X-ray detection panel 210.

Figure 4A:
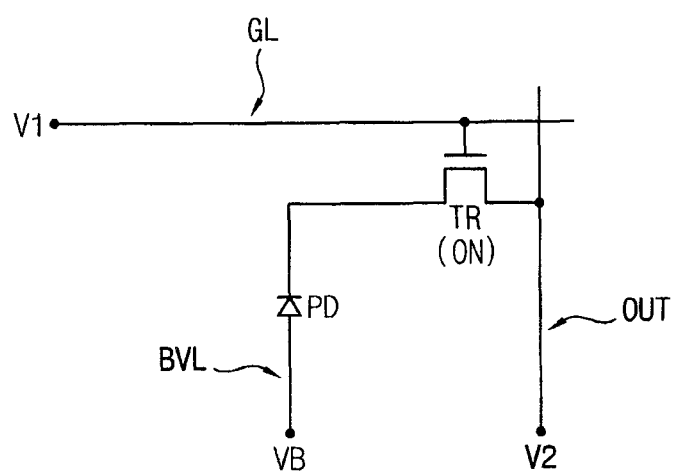
FIGS. 4A and 4B are circuit diagrams illustrating voltages provided to each pixel circuit as an X-ray detection device of FIG. 2 operates.
Figure 4B:
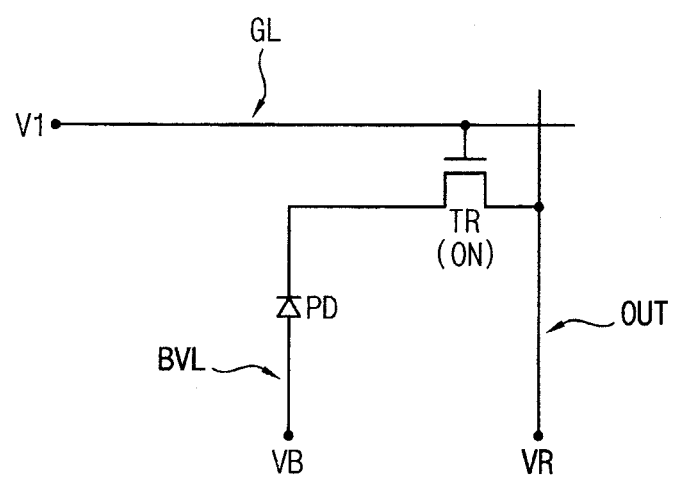

FIGS. 4A and 4B are circuit diagrams illustrating voltages provided to each pixel circuit as an X-ray detection device of FIG. 2 operates.

Referring to FIGS. 4A and 4B, the pixel circuit PX may include the switching transistor TR and the diode PD. Specifically, the gate terminal of the switching transistor TR may be coupled to the gate-line GL, the first terminal of the switching transistor TR may be coupled to the data-line OUT, and the second terminal of the switching transistor TR may be coupled to the cathode of the diode PD. In addition, the anode of the diode PD may be coupled to the bias-line BVL.

FIG. 4A shows the voltages that are provided to each pixel circuit PX when the forward-biasing operation FB is performed on each pixel circuit PX. As described above, the forward-biasing operation FB is simultaneously performed on all pixel circuits PX included in the X-ray detection panel 210. Specifically, the gate terminal of the switching transistor TR may receive the turn-on voltage V1 that is provided from the second operation controller 260 via the gate-line GL when the forward-biasing operation FB is performed in the X-ray detection device 200. Thus, the switching transistor TR may turn-on. In addition, the first terminal of the switching transistor TR may receive the bias reference voltage V2 that is provided from the third operation controller 270 via the data-line OUT when the forward-biasing operation FB is performed in the X-ray detection device 200. Further, the anode of the diode PD may receive the forward-bias voltage VB that is provided from the bias driving circuit 240 via the bias-line BVL when the forward-biasing operation FB is performed in the X-ray detection device 200. Here, since a voltage level of the forward-bias voltage VB is higher than a voltage level of the bias reference voltage V2, the diode PD may be forward-biased, and thus the forward-biasing operation FB may be performed on the pixel circuit PX.

FIG. 4B shows the voltages that are provided to each pixel circuit PX when the initializing operation INI is performed on each pixel circuit PX. As described above, the initializing operation INI is simultaneously performed on all pixel circuits PX included in the X-ray detection panel 210. Specifically, the gate terminal of the switching transistor TR may receive the turn-on voltage V1 that is provided from the second operation controller 260 via the gate-line GL when the initializing operation INI is performed in the X-ray detection device 200. Thus, the switching transistor TR may turn-on. In addition, the first terminal of the switching transistor TR may receive the initialization reference voltage VR that is provided from the readout integrated circuit 230 via the data-line OUT when the initializing operation INI is performed in the X-ray detection device 200. Further, the anode of the diode PD may receive the reverse-bias voltage VB that is provided from the bias driving circuit 240 via the bias-line BVL when the initializing operation INI is performed in the X-ray detection device 200. Here, since a voltage level of the reverse-bias voltage VB is lower than a voltage level of the initialization reference voltage VR, the diode PD may be reverse-biased, and thus the initializing operation INI may be performed on the pixel circuit PX.

Figure 5:
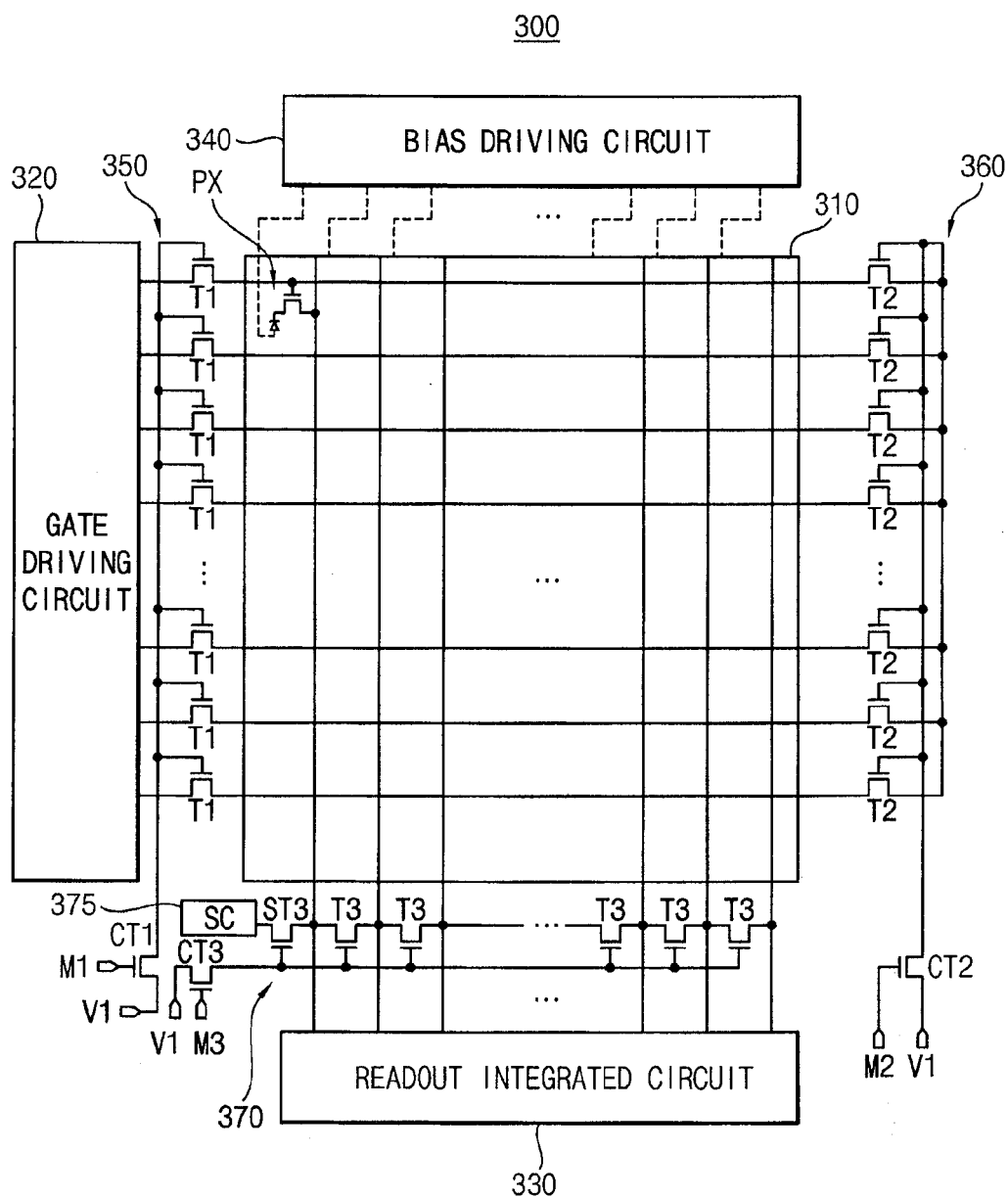
FIG. 5 is a block diagram illustrating another example embodiment of an X-ray detection device of FIG. 1.
Figure 6:
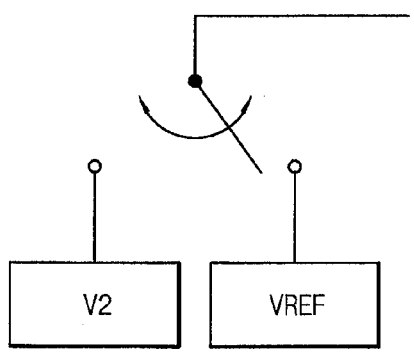
FIG. 6 is a block diagram illustrating a reference voltage selection circuit for providing a selected reference voltage to data-lines in an X-ray detection device of FIG. 5.
Figure 7:
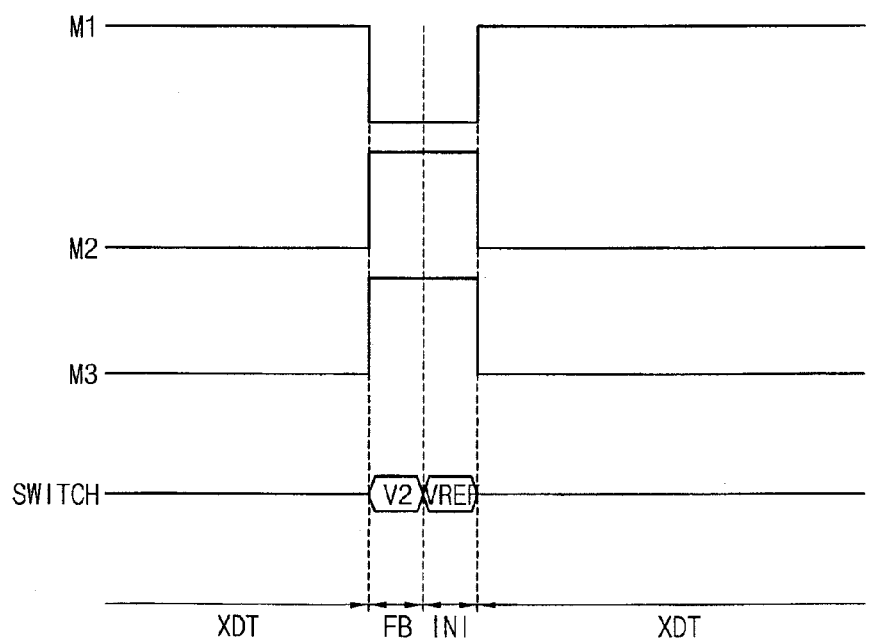
FIG. 7 is a timing diagram illustrating an example in which an X-ray detection device of FIG. 5 operates.

FIG. 5 is a block diagram illustrating another example embodiment of an X-ray detection device of FIG. 1. FIG. 6 is a block diagram illustrating a reference voltage selection circuit for providing a selected reference voltage to data-lines in an X-ray detection device of FIG. 5. FIG. 7 is a timing diagram illustrating an example in which an X-ray detection device of FIG. 5 operates.

Referring to FIGS. 5 through 7, the other example embodiment of the X-ray detection device 100 of FIG. 1 is illustrated in FIG. 5. In detail, the X-ray detection device 300 may include an X-ray detection panel 310, a gate driving circuit 320, a readout integrated circuit 330, a bias driving circuit 340, and an operation control circuit 350, 360, and 370. Since the X-ray detection panel 310, the gate driving circuit 320, the readout integrated circuit 330, and the bias driving circuit 340 are described above, the X-ray detection device 300 will be described focused on the operation control circuit 350, 360, and 370. As described above, the operation control circuit 350, 360, and 370 may include a first operation controller 350, a second operation controller 360, and a third operation controller 370 to simultaneously perform a forward-biasing operation on all pixel circuits PX, and to simultaneously perform an initializing operation on all pixel circuits PX. As illustrated in FIG. 5, each pixel circuit PX may include a switching transistor and a diode. Specifically, a gate terminal of the switching transistor may be coupled to one of the gate-lines GL1 through GLn, a first terminal of the switching transistor may be coupled to one of the data-lines OUT1 through OUTm, and a second terminal of the switching transistor may be coupled to a cathode of the diode. In addition, an anode of the diode may be coupled to one of the bias-lines BVL1 through BVLm.

The first operation controller 350 may connect the gate driving circuit 320 to the X-ray detection panel 310 when an X-ray detecting operation XDT is performed, and may block the gate driving circuit 320 from the X-ray detection panel 310 when a forward-biasing operation FB and an initializing operation INI are performed. For this operation, the first operation controller 350 may include a plurality of first transistors T1 and a first control transistor CT1. Specifically, a first terminal of the first transistor T1 may be coupled to one of the gate-lines GL1 through GLn, a second terminal of the first transistor T1 may be coupled to the gate driving circuit 320, and a gate terminal of the first transistor T1 may be coupled to a second terminal of the first control transistor CT1. As illustrated in FIG. 5, the first transistors T1 may be coupled in parallel. In addition, a first terminal of the first control transistor CT1 may be coupled to a turn-on voltage V1, the second terminal of the first control transistor CT1 may be coupled to respective gate terminals of the first transistors T1, and a gate terminal of the first control transistor CT1 may receive a first control signal M1. As a result, the first transistors T1 may simultaneously turn-on when the X-ray detecting operation XDT is performed because the turn-on voltage V1 is simultaneously provided to respective gate terminals of the first transistors T1 as the first control transistor CT1 turns-on based on the first control signal M1 (e.g., a high voltage level in FIG. 7). On the other hand, the first transistors T1 may simultaneously turn-off when the forward-biasing operation FB and the initializing operation INI are performed because the first control transistor CT1 turns-off based on the first control signal M1 (e.g., a low voltage level in FIG. 7). Thus, the gate driving circuit 320 may be connected to the X-ray detection panel 310 when the X-ray detecting operation XDT is performed in the X-ray detection device 300, and the gate driving circuit 320 may be blocked from the X-ray detection panel 310 when the forward-biasing operation FB and the initializing operation INI are performed in the X-ray detection device 300. Since a structure of the first operation controller 350 illustrated in FIG. 5 is an example, the structure of the first operation controller 350 may be variously designed as long as the first operation controller 350 performs the same function as described above.

The second operation controller 360 may be blocked from the X-ray detection panel 310 when the X-ray detecting operation XDT is performed, and may simultaneously provide the turn-on voltage V1 corresponding to the gate signal to the pixel circuits PX via the gate-lines GL1 through GLn when the forward-biasing operation FB and the initializing operation INI are performed. For this operation, the second operation controller 360 may include a plurality of second transistors T2 and a second control transistor CT2. Specifically, a first terminal of the second transistor T2 may be coupled to one of the gate-lines GL1 through GLn, and a second terminal of the second transistor T2 may be coupled to a gate terminal of the second transistor T2. As illustrated in FIG. 5, the second transistors T2 may also be coupled in parallel. In addition, a first terminal of the second control transistor CT2 may be coupled to the turn-on voltage V1, a second terminal of the second control transistor CT2 may be coupled to respective gate terminals of the second transistors T2, and a gate terminal of the second control transistor CT2 may receive a second control signal M2. As a result, the second transistors T2 may simultaneously turn-off when the X-ray detecting operation XDT is performed because the second control transistor CT2 turns-off based on the second control signal M2 (e.g., a low voltage level in FIG. 7). On the other hand, the second transistors T2 may simultaneously turn-on when the forward-biasing operation FB and the initializing operation INI are performed because the turn-on voltage V1 is simultaneously provided to respective gate terminals of the second transistors T2 as the second control transistor CT2 turns-on based on the second control signal M2 (e.g., a high voltage level in FIG. 7). That is, the turn-on voltage V1 may be simultaneously provided to the pixel circuits PX via the gate-lines GL1 through GLn. Thus, the second operation controller 360 may be blocked from the X-ray detection panel 310 when the X-ray detecting operation XDT is performed in the X-ray detection device 300, and the second operation controller 360 may be connected to the X-ray detection panel 310 when the forward-biasing operation FB and the initializing operation INI are performed in the X-ray detection device 300. Since a structure of the second operation controller 360 illustrated in FIG. 5 is an example, the structure of the second operation controller 360 may be variously designed as long as the second operation controller 360 performs the same function as described above.

The third operation controller 370 may be blocked from the X-ray detection panel 310 when the X-ray detecting operation XDT is performed, may simultaneously provide the bias reference voltage V2 to the pixel circuits PX via the data-lines OUT1 through OUTm when the forward-biasing operation FB is performed, and may simultaneously provide an initialization reference voltage VREF to the pixel circuits PX via the data-lines OUT1 through OUTm when initializing operation INI is performed. For this operation, the third operation controller 370 may include a plurality of third transistors T3, a third sub-transistor ST3, and a third control transistor CT3. Specifically, a first terminal of the third transistor T3 may be coupled to one of the data-lines OUT1 through OUTm, a second terminal of the third transistor T3 may be coupled to another of the data-lines OUT1 through OUTm, and a gate terminal of the third transistor T3 may be coupled to a second terminal of the third control transistor CT3. In addition, a first terminal of the third sub-transistor ST3 may be coupled to a selection circuit 375, a second terminal of the third sub-transistor ST3 may be coupled to one of the third transistors T3, and a gate terminal of the third sub-transistor ST3 may be coupled to the second terminal of the third control transistor CT3. As illustrated in FIG. 5, the third transistors T3 and the third sub-transistor ST3 may be coupled in series. Here, a first terminal of the third control transistor CT3 may be coupled to the turn-on voltage V1, a second terminal of the third control transistor CT3 may be coupled to respective gate terminals of the third transistors T3 and a gate terminal of the third sub-transistor ST3, and a gate terminal of the third control transistor CT3 may receive a third control signal M3. As a result, the third transistors T3 and the third sub-transistor ST3 may simultaneously turn-off when the X-ray detecting operation XDT is performed because the third control transistor CT3 turns-off based on the third control signal M3 (e.g., a low voltage level in FIG. 7). On the other hand, the third transistors T3 and the third sub-transistor ST3 may simultaneously turn-on when the forward-biasing operation FB and the initializing operation INI are performed because the turn-on voltage V1 is simultaneously provided to respective gate terminals of the third transistors T3 and the gate terminal of the third sub-transistor ST3 as the third control transistor CT3 turns-on based on the third control signal M3 (e.g., a high voltage level in FIG. 7).

As described above, the first terminal of the third sub-transistor ST3 may be coupled to the selection circuit 375. As illustrated in FIG. 6, the selection circuit 375 may selectively output the bias reference voltage V2 and the initialization reference voltage VREF by performing a switching operation when the forward-biasing operation FB and the initializing operation INI are performed in the X-ray detection device 300. Specifically, the third operation controller 370 may simultaneously provide the bias reference voltage V2 to the pixel circuits PX via the data-lines OUT1 through OUTm because the selection circuit 375 selects the bias reference voltage V2 when the forward-biasing operation FB is performed in the X-ray detection device 300. In addition, the third operation controller 370 may simultaneously provide the initialization reference voltage VREF to the pixel circuits PX via the data-lines OUT1 through OUTm because the selection circuit 375 selects the initialization reference voltage VREF when the initializing operation INI is performed in the X-ray detection device 300. Thus, the third operation controller 370 may be blocked from the X-ray detection panel 310 when the X-ray detecting operation XDT is performed in the X-ray detection device 300, and the third operation controller 370 may be connected to the X-ray detection panel 310 when the forward-biasing operation FB and the initializing operation INI are performed in the X-ray detection device 300. Here, when the forward-biasing operation FB is performed, a voltage level of the bias reference voltage V2 that is provided via the data-lines OUT1 through OUTm may be lower than a voltage level of the forward-bias voltage that is provided via the bias-lines BVL1 through BVLm. Accordingly, when the forward-biasing operation FB is performed, a diode of each pixel circuit PX may be forward-biased. In addition, when the initializing operation INI is performed, a voltage level of the initialization reference voltage VREF that is provided via the data-lines OUT1 through OUTm may be higher than a voltage level of the reverse-bias voltage that is provided via the bias-lines BVL1 through BVLm. Accordingly, when the initializing operation INI is performed, the diode of each pixel circuit PX may be reverse-biased. Since a structure of the third operation controller 370 illustrated in FIG. 5 is an example, the structure of the third operation controller 370 may be variously designed as long as the third operation controller 370 performs the same function as described above.

Accordingly, because of the first through third operation controllers 350, 360, and 370, the X-ray detection device 300 may simultaneously perform the forward-biasing operation FB on the pixel circuits PX by simultaneously providing the turn-on voltage V1 to the pixel circuits PX via the gate-lines GL1 through GLn, by simultaneously providing the bias reference voltage V2 to the pixel circuits PX via the data-lines OUT1 through OUTm, and by simultaneously providing the forward-bias voltage to the pixel circuits PX via the bias-lines BVL1 through BVLm when the forward-biasing operation FB is performed. In addition, because of the first through third operation controllers 350, 360, and 370, the X-ray detection device 300 may simultaneously perform the initializing operation INI on the pixel circuits PX by simultaneously providing the turn-on voltage V1 to the pixel circuits PX via the gate-lines GL1 through GLn, by simultaneously providing the initialization reference voltage VREF to the pixel circuits PX via the data-lines OUT1 through OUTm, and by simultaneously providing the reverse-bias voltage to the pixel circuits PX via the bias-lines BVL1 through BVLm when the initializing operation INI is performed. Here, the initialization reference voltage VREF may be provided by the X-ray detection panel 310 because the third operation controller 370 is connected to the X-ray detection panel 310 when the initializing operation INI is performed. Further, because of the first through third operation controllers 350, 360, and 370, the X-ray detection device 300 may sequentially perform the X-ray detecting operation XDT on the pixel circuits PX for each gate-line by sequentially providing the gate signal to the pixel circuits PX via the gate-lines GL1 through GLn, by simultaneously providing the reverse-bias voltage to the pixel circuits PX via the bias-lines BVL1 through BVLm, and by sequentially performing the readout operation of the detection signal output from the data-lines OUT1 through OUTm when the X-ray detecting operation XDT is performed. Therefore, the X-ray detection device 300 may efficiently reduce an image-lag without fill-factor decreases and frame-rate decreases by simultaneously performing the forward-biasing operation FB on all pixel circuits PX included in the X-ray detection panel 310, and by performing the initializing operation INI on all pixel circuits PX included in the X-ray detection panel 310.

Figure 8A:
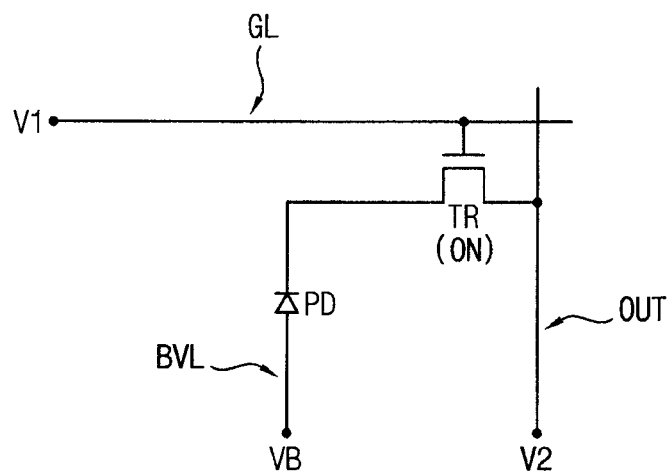
FIGS. 8A and 8B are circuit diagrams illustrating voltages provided to each pixel circuit as an X-ray detection device of FIG. 5 operates.
Figure 8B:
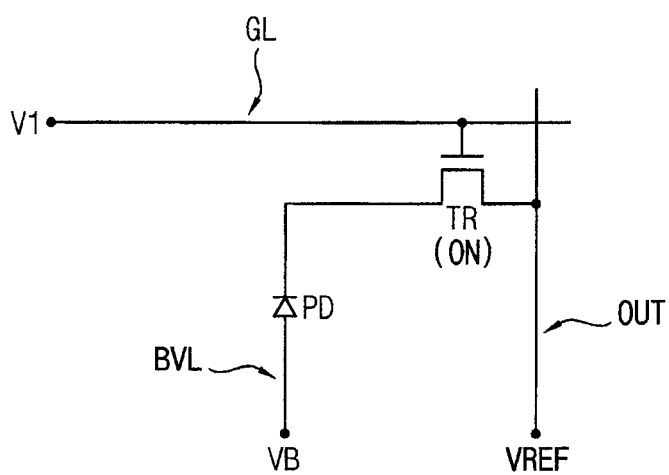

FIGS. 8A and 8B are circuit diagrams illustrating voltages provided to each pixel circuit as an X-ray detection device of FIG. 5 operates.

Referring to FIGS. 8A and 8B, the pixel circuit PX may include the switching transistor TR and the diode PD. Specifically, the gate terminal of the switching transistor TR may be coupled to the gate-line GL, the first terminal of the switching transistor TR may be coupled to the data-line OUT, and the second terminal of the switching transistor TR may be coupled to the cathode of the diode PD. In addition, the anode of the diode PD may be coupled to the bias-line BVL.

FIG. 8A shows the voltages that are provided to each pixel circuit PX when the forward-biasing operation FB is performed on each pixel circuit PX. As described above, the forward-biasing operation FB is simultaneously performed on all pixel circuits PX included in the X-ray detection panel 310. Specifically, the gate terminal of the switching transistor TR may receive the turn-on voltage V1 that is provided from the second operation controller 360 via the gate-line GL when the forward-biasing operation FB is performed in the X-ray detection device 300. Thus, the switching transistor TR may turn-on. In addition, the first terminal of the switching transistor TR may receive the bias reference voltage V2 that is provided from the third operation controller 370 via the data-line OUT when the forward-biasing operation FB is performed in the X-ray detection device 300. Further, the anode of the diode PD may receive the forward-bias voltage VB that is provided from the bias driving circuit 340 via the bias-line BVL when the forward-biasing operation FB is performed in the X-ray detection device 300. Here, since a voltage level of the forward-bias voltage VB is higher than a voltage level of the bias reference voltage V2, the diode PD may be forward-biased, and thus the forward-biasing operation FB may be performed on the pixel circuit PX.

FIG. 8B shows the voltages that are provided to each pixel circuit PX when the initializing operation INI is performed on each pixel circuit PX. As described above, the initializing operation INI is simultaneously performed on all pixel circuits PX included in the X-ray detection panel 310. Specifically, the gate terminal of the switching transistor TR may receive the turn-on voltage V1 that is provided from the second operation controller 360 via the gate-line GL when the initializing operation INI is performed in the X-ray detection device 300. Thus, the switching transistor TR may turn-on. In addition, the first terminal of the switching transistor TR may receive the initialization reference voltage VREF that is provided from the third operation controller 370 via the data-line OUT when the initializing operation INI is performed in the X-ray detection device 300. Further, the anode of the diode PD may receive the reverse-bias voltage VB that is provided from the bias driving circuit 340 via the bias-line BVL when the initializing operation INI is performed in the X-ray detection device 300. Here, since a voltage level of the reverse-bias voltage VB is lower than a voltage level of the initialization reference voltage VREF, the diode PD may be reverse-biased, and thus the initializing operation INI may be performed on the pixel circuit PX.

Figure 9:
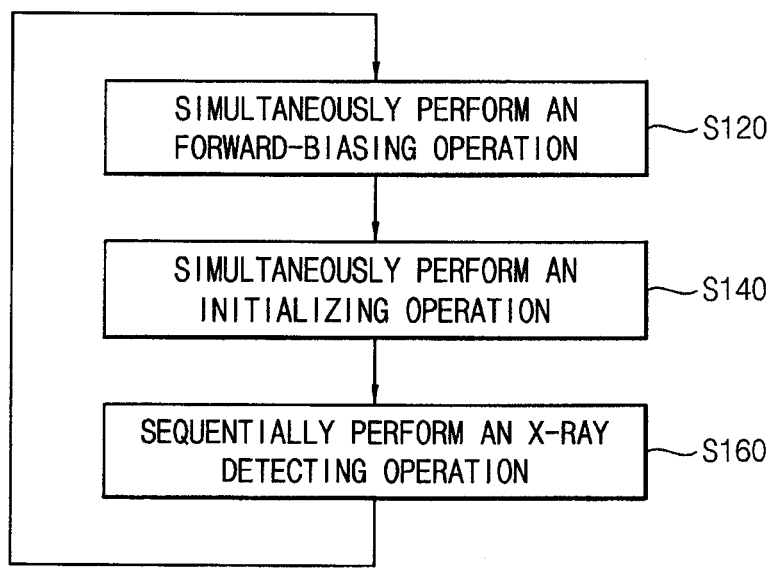
FIG. 9 is a flow chart illustrating a method of driving an X-ray detection panel according to example embodiments.

FIG. 9 is a flow chart illustrating a method of driving an X-ray detection panel according to example embodiments.

Referring to FIG. 9, the method of FIG. 9 may simultaneously perform a forward-biasing operation on all pixel circuits included in an X-ray detection panel (Step S120), where the X-ray detection panel includes a plurality of gate-lines, a plurality of data-lines, a plurality of bias-lines, and a plurality of pixel circuits, may simultaneously perform an initializing operation on all pixel circuits (Step S140), and may sequentially perform an X-ray detecting operation on the pixel circuits for each gate-line (Step S160). The Steps S120, S140, and S160 can be repeated. Here, each pixel circuit may include a switching transistor and a diode. Specifically, a gate terminal of the switching transistor may be coupled to one of the gate-lines, a first terminal of the switching transistor may be coupled to one of the data-lines, and a second terminal of the switching transistor may be coupled to a cathode of the diode. In addition, an anode of the diode may be coupled to one of the bias-lines. On this basis, the method of FIG. 9 may simultaneously provide a turn-on voltage to the gate-lines, may simultaneously provide a bias reference voltage to the data-lines, and may simultaneously provide a forward-bias voltage to the bias-lines to simultaneously perform the forward-biasing operation on all pixel circuits included in the X-ray detection panel. In addition, the method of FIG. 9 may simultaneously provide the turn-on voltage to the gate-lines, may simultaneously provide the initialization reference voltage to the data-lines, and may simultaneously provide the reverse-bias voltage to the bias-lines to simultaneously perform the initializing operation on all pixel circuits included in the X-ray detection panel. Further, the method of FIG. 9 may sequentially provide the gate signal to the gate-lines, may simultaneously provide the reverse-bias voltage to the bias-lines, and may sequentially perform a readout operation of a detection signal output from the data-lines to sequentially perform the X-ray detection operation on the pixel circuits included in the X-ray detection panel. Therefore, the method of FIG. 1 may efficiently reduce an image-lag without fill-factor decreases and frame-rate decreases by simultaneously performing the forward-biasing operation on all pixel circuits included in the X-ray detection panel, and by performing the initializing operation on all pixel circuits included in the X-ray detection panel.

Figure 10:
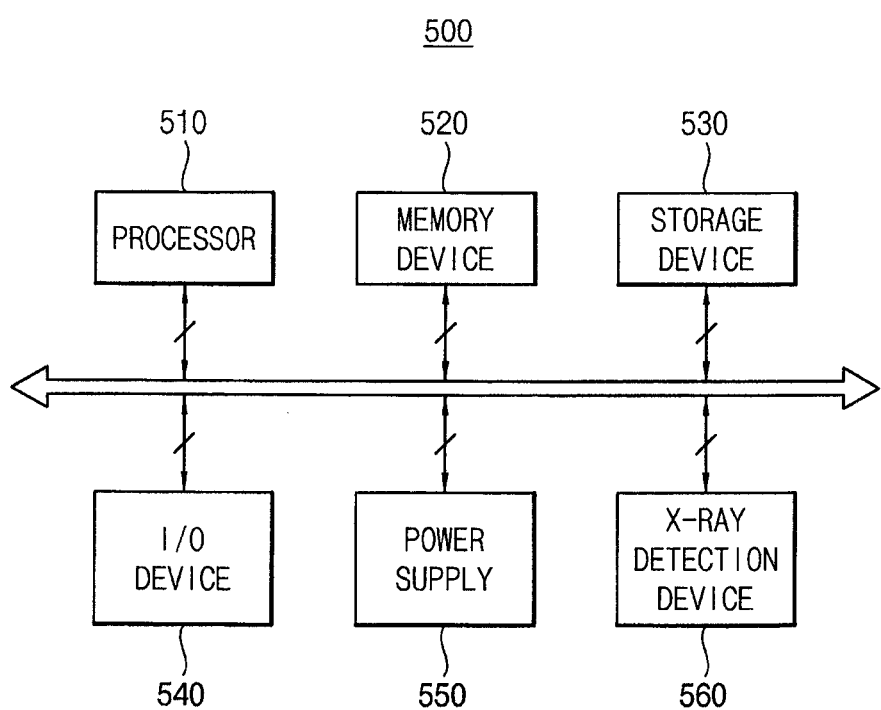
FIG. 10 is a block diagram illustrating a computing system having an X-ray detection device according to example embodiments.

FIG. 10 is a block diagram illustrating a computing system having an X-ray detection device according to example embodiments.

Referring to FIG. 10, the computing system 500 may include a processor 510, a memory device 520, a storage device 530, an input/output (I/O) device 540, a power supply 550, and an X-ray detection device 560. Here, the X-ray detection device 560 may correspond to the X-ray detection device 100 of FIG. 1. In addition, the computing system 500 may further include a plurality of ports for communicating a video card, a sound card, a memory card, a universal serial bus (USB) device, other electronic devices, etc.

The processor 510 may perform various computing functions. The processor 510 may be a micro-processor, a central processing unit (CPU), etc. The processor 510 may be coupled to other components via an address bus, a control bus, a data bus, etc. Further, the processor 510 may be coupled to an extended bus such as a peripheral component interconnection (PCI) bus. The memory device 520 may store data for operations of the computing system 500. For example, the memory device 520 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 530 may be a solid state drive (SSD) device, a hard disk drive (HDD) device, a CD-ROM device, etc.

The I/O device 540 may be an input device such as a keyboard, a keypad, a touchpad, a touch-screen, a mouse, etc, and an output device such as a display device (e.g., a liquid crystal display device, an organic light emitting display device, etc), a printer, a speaker, etc. The power supply 550 may provide a power for operations of the computing system 500. The X-ray detection device 560 may communicate with other components via the buses or other communication links. As described above, the X-ray detection device 560 may include an X-ray detection panel, a gate driving circuit, a readout integrated circuit, a bias driving circuit, and an operation control circuit (i.e., first through third operation controllers). On this basis, the X-ray detection device 560 may simultaneously perform a forward-biasing operation on all pixel circuits included in the X-ray detection panel, and may simultaneously perform an initializing operation on all pixel circuits included in the X-ray detection panel. As a result, the X-ray detection device 560 may efficiently reduce an image-lag without fill-factor decreases and frame-rate decreases. Since the X-ray detection device 560 is described above, a detailed description related to the X-ray detection device 560 will not be repeated. The present inventive concept may be applied to any suitable computing system having an X-ray detection device.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

1. An X-ray detection device comprising:
an X-ray detection panel having a plurality of gate-lines, a plurality of data-lines, a plurality of bias-lines, and a plurality of pixel circuits;
a gate driving circuit configured to sequentially provide a gate signal to the pixel circuits via the gate-lines when an X-ray detecting operation is performed;
a readout integrated circuit configured to perform a readout operation of a detection signal that is output from the pixel circuits via the data-lines when the X-ray detecting operation is performed;
a bias driving circuit configured to provide a forward-bias voltage or a reverse-bias voltage to the pixel circuits via the bias-lines; and
an operation control circuit configured to control a forward-biasing operation to be simultaneously performed on the pixel circuits, and an initializing operation to be simultaneously performed on the pixel circuits,
wherein the operation control circuit comprises:
a first operation controller configured to connect the gate driving circuit to the X-ray detection panel when the X-ray detecting operation is performed, and to block the gate driving circuit from the X-ray detection panel when the forward-biasing operation and the initializing operation are performed; and
a second operation controller configured to be blocked from the X-ray detection panel when the X-ray detecting operation is performed, and to simultaneously provide a turn-on voltage corresponding to the gate signal to the pixel circuits via the gate-lines when the forward-biasing operation and the initializing operation are performed.

2. The device of claim 1, wherein each of the pixel circuits comprises:
a switching transistor having a gate terminal coupled to one of the gate-lines and a first terminal coupled to one of the data-lines; and a diode having a cathode coupled to a second terminal of the switching transistor and an anode coupled to one of the bias-lines.

3. The device of claim 2, wherein the diode is configured to receive an X-ray to generate charges corresponding to the detection signal.

4. The device of claim 2, wherein the diode is configured to receive a visible-ray to generate charges corresponding to the detection signal when an X-ray is converted to the visible-ray by a scintillator.

5. The device of claim 2, wherein the operation control circuit comprises:
   a third operation controller configured to be blocked from the X-ray detection panel when the X-ray detecting operation is performed, and to simultaneously provide a bias reference voltage to the pixel circuits via the data-lines when the forward-biasing operation is performed.

6. The device of claim 5, wherein the bias driving circuit is configured to provide the reverse-bias voltage to the pixel circuits when the initializing operation and the X-ray detecting operation are performed, and
   wherein the bias driving circuit is configured to provide the forward-bias voltage to the pixel circuits when the forward-biasing operation is performed.

7. The device of claim 5, wherein the first operation controller comprises:
   a plurality of first transistors each having a first terminal coupled to one of the gate-lines and a second terminal coupled to the gate driving circuit; and
   a first control transistor having a first terminal coupled to the turn-on voltage, a second terminal coupled to respective gate terminals of the first transistors, and a gate terminal is configured to receive a first control signal.

8. The device of claim 7, wherein the first control transistor is configured to turn-on based on the first control signal, and the first transistors simultaneously are configured to turn-on when the X-ray detecting operation is performed, and
   wherein the first control transistor is configured to turn-off based on the first control signal, and the first transistors simultaneously are configured to turn-off when the forward-biasing operation and the initializing operation are performed.

9. The device of claim 5, wherein the second operation controller comprises:
   a plurality of second transistors each having a first terminal coupled to one of the gate-lines and a second terminal coupled to a gate terminal of the second transistor; and
   a second control transistor having a first terminal coupled to the turn-on voltage, a second terminal coupled to respective gate terminals of the second transistors, and a gate terminal is configured to receive a second control signal.

10. The device of claim 9, wherein the second control transistor is configured to turn-off based on the second control signal, and the second transistors simultaneously are configured to turn-off when the X-ray detecting operation is performed, and
    wherein the second control transistor is configured to turn-on based on the second control signal, and the second transistors simultaneously are configured to turn-on when the forward-biasing operation and the initializing operation are performed.

11. The device of claim 5, wherein the third operation controller comprises:
    a plurality of third transistors each having a first terminal coupled to one of the data-lines and a second terminal coupled to another of the data-lines;
    a third sub-transistor having a first terminal coupled to the bias reference voltage and a second terminal coupled to one of the third transistors; and
    a third control transistor having a first terminal coupled to the turn-on voltage, a second terminal coupled to respective gate terminals of the third transistors and a gate terminal of the third sub-transistor, and a gate terminal is configured to receive a third control signal.

12. The device of claim 11, wherein the third control transistor is configured to turn-off based on the third control signal, and the third sub-transistor and the third transistors simultaneously are configured to turn-off when the initializing operation and the X-ray detecting operation are performed, and
    wherein the third control transistor is configured to turn-on based on the third control signal, and the third sub-transistor and the third transistors simultaneously are configured to turn-on when the forward-biasing operation is performed.

13. The device of claim 12, wherein an initialization reference voltage is provided to the data-lines by the readout integrated circuit when the initializing operation is performed.

14. The device of claim 5, wherein the third operation controller comprises:
    a plurality of third transistors each having a first terminal coupled to one of the data-lines and a second terminal coupled to another of the data-lines;
    a reference voltage selection circuit configured to output the bias reference voltage when the forward-biasing operation is performed, and to output an initialization reference voltage when the initializing operation is performed;
    a third sub-transistor having a first terminal coupled to the reference voltage selection circuit and a second terminal coupled to one of the third transistors; and
    a third control transistor having a first terminal coupled to the turn-on voltage, a second terminal coupled to respective gate terminals of the third transistors and a gate terminal of the third sub-transistor, and a gate terminal is configured to receive a third control signal.

15. The device of claim 14, wherein the third control transistor is configured to turn-off based on the third control signal, and the third sub-transistor and the third transistors are configured to simultaneously turn-off when the X-ray detecting operation is performed, and
    wherein the third control transistor is configured to turn-on based on the third control signal, and the third sub-transistor and the third transistors simultaneously are configured to turn-on when the forward-biasing operation and the initializing operation are performed.

16. The device of claim 15, wherein the initialization reference voltage is provided to the data-lines by the third operation controller when the initializing operation is performed.

17. A method of driving an X-ray detection panel having a plurality of gate-lines, a plurality of data-lines, a plurality of bias-lines, a plurality of pixel circuits, and an operation control circuit, the method comprising:
    simultaneously performing a forward-biasing operation on the pixel circuits via the operation control circuit;
    simultaneously performing an initializing operation on the pixel circuits via the operation control circuit; and
    sequentially performing an X-ray detecting operation on the pixel circuits for each gate-line via the operation control circuit,
    wherein the operation control circuit comprises:

a first operation controller configured to connect the gate driving circuit to the X-ray detection panel when the X-ray detecting operation is performed, and to block the gate driving circuit from the X-ray detection panel when the forward-biasing operation and the initializing operation are performed; and a second operation controller configured to be blocked from the X-ray detection panel when the X-ray detecting operation is performed, and to simultaneously provide a turn-on voltage corresponding to a gate signal to the pixel circuits via the gate-lines when the forward-biasing operation and the initializing operation are performed.

18. The method of claim 17, wherein the simultaneously performing of the forward-biasing operation comprises:

simultaneously providing a turn-on voltage to the gate-lines;

simultaneously providing a bias reference voltage to the data-lines; and simultaneously providing a forward-bias voltage to the bias-lines.

19. The method of claim 17, wherein the simultaneously performing of the initializing operation comprises:

simultaneously providing a turn-on voltage to the gate-lines;

simultaneously providing an initialization reference voltage to the data-lines; and simultaneously providing a reverse-bias voltage to the bias-lines.

20. The method of claim 17, wherein the sequentially performing of the X-ray detecting operation comprises:

sequentially providing a gate signal to the gate-lines;

simultaneously providing a reverse-bias voltage to the bias-lines; and sequentially performing a readout operation of a detection signal that is output from the data-lines.

21. A system of driving an X-ray detection panel having a plurality of gate-lines, a plurality of data-lines, a plurality of bias-lines, and a plurality of pixel circuits, the system comprising:

means for simultaneously performing a forward-biasing operation on the pixel circuits;

means for simultaneously performing an initializing operation on the pixel circuits; and means for sequentially performing an X-ray detecting operation on the pixel circuits for each gate-line.

* * * * *